United States Patent
Tsuboi et al.

(10) Patent No.: US 9,081,699 B2
(45) Date of Patent: Jul. 14, 2015

(54) RELAY DEVICE

(71) Applicant: HONDA MOTOR CO., LTD., Tokyo (JP)

(72) Inventors: Michitaka Tsuboi, Wako (JP); Masanori Matsuura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/279,367

(22) Filed: May 16, 2014

(65) Prior Publication Data

US 2014/0351460 A1 Nov. 27, 2014

(30) Foreign Application Priority Data

May 23, 2013 (JP) .................................. 2013-108940

(51) Int. Cl.
| | |
|---|---|
| *G06F 13/10* | (2006.01) |
| *G06F 9/445* | (2006.01) |
| *G06F 11/07* | (2006.01) |
| *H04L 29/08* | (2006.01) |
| *H04L 12/40* | (2006.01) |

(52) U.S. Cl.
CPC ........ *G06F 13/10* (2013.01); *G06F 8/60* (2013.01); *G06F 8/665* (2013.01); *G06F 8/67* (2013.01); *G06F 11/0757* (2013.01); *H04L 67/12* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 5,278,759 A | | 1/1994 | Berra et al. |
| 5,630,139 A | * | 5/1997 | Ozaki ........................... 717/167 |
| 6,144,887 A | * | 11/2000 | Kamiya et al. .................. 700/79 |
| 6,249,848 B1 | * | 6/2001 | Terada et al. ................. 711/154 |
| 6,275,911 B1 | * | 8/2001 | Terada et al. ................. 711/154 |
| 6,477,626 B1 | * | 11/2002 | Terada et al. ................. 711/154 |
| 6,493,593 B1 | * | 12/2002 | Kamiya et al. ................... 700/2 |
| 6,505,280 B2 | * | 1/2003 | Terada et al. ................. 711/164 |
| 6,636,989 B1 | * | 10/2003 | Kondo et al. ................... 714/23 |
| 6,850,973 B1 | | 2/2005 | Larson et al. |
| 6,957,296 B2 | * | 10/2005 | Terada et al. ................. 711/103 |
| 7,225,066 B2 | * | 5/2007 | Yasuda ....................... 701/34.3 |

(Continued)

FOREIGN PATENT DOCUMENTS

| | | | |
|---|---|---|---|
| CN | 202362661 U | * | 8/2012 |
| CN | 103117920 A | * | 5/2013 |

(Continued)

OTHER PUBLICATIONS

Japanese Office action dated Dec. 4, 2014, in response to Applicant's Foreign Priority Application JP 2013-108940.

(Continued)

*Primary Examiner* — Steven Snyder
(74) *Attorney, Agent, or Firm* — Rankin, Hill & Clark LLP

(57) ABSTRACT

While software in a relay device is being rewritten by an external diagnosis device, a processing unit of the relay device prohibits transfer processing of data from each ECU connected to CAN bus and allows transfer processing of data, which is transmitted from the external diagnosis device and which indicates at least either one of transmission prohibition of periodic transmission data and storage prohibition of a failure code into each ECU by not receiving the periodic transmission data in each ECU, to the CAN buses.

2 Claims, 4 Drawing Sheets

(56) References Cited

U.S. PATENT DOCUMENTS

| | | | |
|---|---|---|---|
| 7,562,167 B2* | 7/2009 | Anderson | 710/38 |
| 7,831,678 B2* | 11/2010 | Okamoto | 709/208 |
| 7,869,458 B2* | 1/2011 | Sonoda et al. | 370/464 |
| 8,041,747 B2* | 10/2011 | Nishihashi et al. | 707/802 |
| 8,081,643 B2* | 12/2011 | Sonoda et al. | 370/401 |
| 8,239,850 B2* | 8/2012 | Gielniak et al. | 717/168 |
| 2002/0099905 A1* | 7/2002 | Terada et al. | 711/103 |
| 2003/0041217 A1* | 2/2003 | Terada et al. | 711/154 |
| 2006/0053235 A1* | 3/2006 | Terada et al. | 710/16 |
| 2006/0130043 A1* | 6/2006 | Park et al. | 717/168 |
| 2009/0076630 A1* | 3/2009 | Okamoto | 700/7 |
| 2009/0119657 A1* | 5/2009 | Link, II | 717/171 |
| 2010/0070106 A1* | 3/2010 | Okamoto et al. | 701/1 |
| 2010/0115120 A1* | 5/2010 | Staiger | 709/231 |
| 2010/0329272 A1* | 12/2010 | Tsuboi et al. | 370/401 |
| 2012/0307836 A1* | 12/2012 | Ishigooka et al. | 370/401 |
| 2014/0006555 A1* | 1/2014 | Shields | 709/217 |
| 2014/0082599 A1* | 3/2014 | Kim | 717/168 |
| 2014/0137091 A1* | 5/2014 | Kim | 717/168 |
| 2014/0297109 A1* | 10/2014 | Shimomura et al. | 701/36 |

FOREIGN PATENT DOCUMENTS

| | | | |
|---|---|---|---|
| DE | 10014561 | | 9/2001 |
| JP | 2003244187 A | * | 8/2003 |
| JP | 2007-243322 | | 9/2007 |
| JP | 2008-155736 | | 7/2008 |
| JP | 2010-258990 | | 11/2010 |
| WO | WO 2005004160 A2 | * | 1/2005 |

OTHER PUBLICATIONS

German Search Report with English Translation dated Feb. 23, 2015, 20 pages.

* cited by examiner

RELAY DEVICE

BACKGROUND

1. Technical Field

The present invention relates to a relay device that relays data between buses, in particular to a relay device used for in-vehicle network.

2. Related Art

In an in-vehicle network installed in a vehicle, a plurality of ECUs (Electronic Control Units) that control hardware of the vehicle are connected through CAN (Controller Area Network) buses and the buses are connected through a gateway device.

Such a gateway device for vehicle, which is connected between a plurality of buses and transmits data, is disclosed in JP 2007-243322 A.

SUMMARY

By the way, an external diagnosis device may rewrite software of the gateway device. While rewriting the software of the gateway device itself, to reduce processing load in order to reduce the rewriting time, it is desired to prohibit other processing, that is, data transmission between the ECUs.

However, there is a problem that an error code is stored if data which is periodically transmitted between the ECUs and is assumed to be periodically received is not received.

A relay device of the present invention includes a processing unit and is located between network buses to which a plurality of electronic control devices are communicably connected. The processing unit prohibits transfer processing of data from each electronic control device connected to the network bus while software in the relay device is being rewritten by an external device. Further, the processing unit allows transfer processing of prohibition data, which is transmitted from the external device and which indicates at least either one of transmission prohibition of periodic transmission data and storage prohibition of a failure code into each electronic control device by not receiving the periodic transmission data in each electronic control device, to the network buses.

According to one aspect of the present invention, the prohibition data is valid only for a predetermined period of time from when each electronic control device receives the prohibition data. Each electronic control device returns to an operational state prior to receive the prohibition data after the predetermined period of time, which is a valid period of the prohibition data, elapses from when receiving the prohibition data. The processing unit receives the prohibition data from the external device at a cycle shorter than or equal to the predetermined period of time while the software is being rewritten.

Further, a relay device of the present invention includes a processing unit and is located between network buses to which a plurality of electronic control devices are communicably connected. The processing unit transmits prohibition data, which indicates at least either one of transmission prohibition of periodic transmission data and storage prohibition of a failure code into each electronic control device by not receiving the periodic transmission data in each electronic control device connected to the network bus, to the network buses while the software in the relay device is being rewritten.

Further, according to one aspect of the present invention, the prohibition data is valid only for a predetermined period of time from when each electronic control device receives the prohibition data. Each electronic control device returns to an operational state prior to receive the prohibition data after the predetermined period of time, which is a valid period of the prohibition data, elapses from when receiving the prohibition data. The processing unit transmits the prohibition data to the network buses at a cycle shorter than or equal to the predetermined period of time while the software is being rewritten.

According to the present invention, it is possible to rewrite software with a small processing load without causing a communication failure of ECU while rewriting software of a relay device itself.

DETAILED DESCRIPTION

Hereinafter, embodiments of the present invention will be described with reference to the drawings.

First Embodiment

Figure 1:
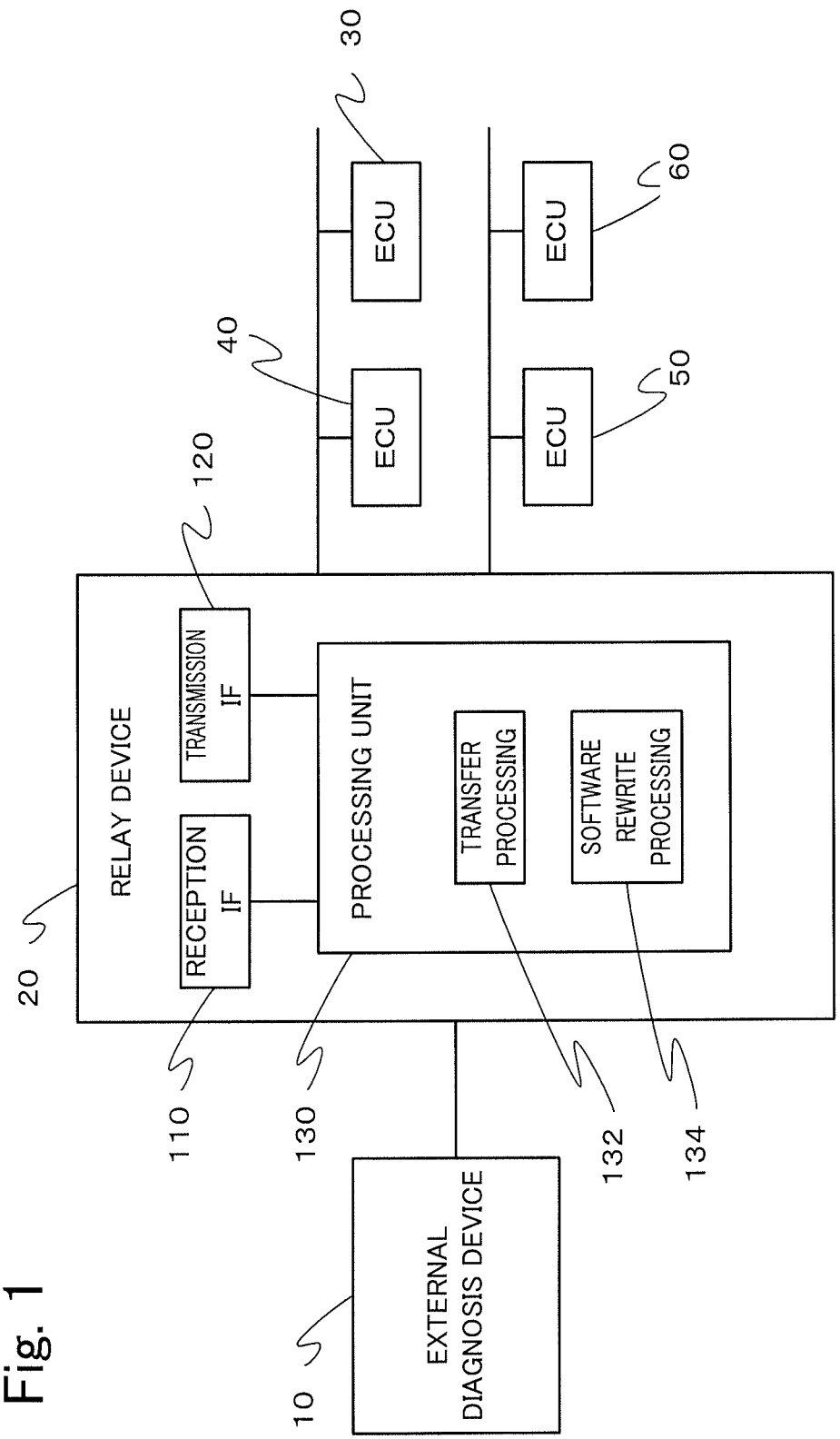
FIG. 1 is a block diagram showing a configuration of an in-vehicle network including a relay device according to a first embodiment of the present invention.

FIG. 1 is a block diagram showing a configuration of an in-vehicle network including a relay device according to the first embodiment of the present invention.

An external diagnosis device 10 and a relay device 20 are connected through a CAN bus 1 that is a type of the CAN bus. The relay device 20 and the ECUs 30 and 40 are connected through a CAN bus 2 that is another CAN bus. The relay device 20 and the ECUs 50 and 60 are connected through a CAN bus 3 that is further another CAN bus. The CAN bus is a type of a network bus that connects a plurality of electronic control devices to be able to communicate with each other. In this way, the relay device 20 is located between the network buses to which a plurality of electronic control devices are communicably connected.

The relay device 20 and the ECUs 30, 40, 50, and 60 are connected by not only the CAN bus, but also other in-vehicle equipment network buses, to which a plurality of electronic control devices are communicably connected, such as a network using a LIN (Local Interconnect Network) or an XCP (Universal Calibration Protocol).

The external diagnosis device 10 is an external device that diagnoses a failure of the vehicle and a theft prohibition function. The external diagnosis device 10 has a function to rewrite software of the relay device 20.

The relay device 20 is a device that relays data transmission/reception between the ECUs 30, 40, 50, and 60 and also relays communication between the external diagnosis device 10 and the ECUs 30, 40, 50, and 60. The relay device 20 is, for example, a gateway device.

The ECUs 30, 40, 50, and 60 are electronic control devices, which are units that control the engine ignition timing, fuel injection, idling-stop, and the like.

The relay device 20 includes a reception IF 110, a transmission IF 120, and a processing unit 130.

The reception IF 110 is a unit that receives a signal transmitted from the external diagnosis device 10 or the ECU 30,

40, 50, or 60. The transmission IF 120 is a unit that transmits a signal to the external diagnosis device 10 or the ECU 30, 40, 50, or 60.

The processing unit 130 is a computer including a processor such as a CPU (Central Processing Unit) and a memory such as a ROM (Read Only Memory) to which a program is written and a RAM (Random Access Memory) for temporarily storing data. The processing unit 130 includes a transfer processing unit 132 and a software rewrite processing unit 134. The processing unit 130, which is a computer, executes a program, and thereby each unit included in the processing unit 130 is realized. The computer program can be stored in any computer-readable storage medium.

Each unit included in the processing unit 130 may not only be realized by executing a program, but also may be formed as dedicated hardware including one or more electrical components.

The software rewrite processing unit 134 performs rewrite processing of various software included in the relay device 20. The software rewrite processing unit 134 performs the rewrite processing of software according to software rewrite data received from the external diagnosis device 10 through the reception IF 110.

Next, an operation of transfer processing performed by the transfer processing unit 132 will be described in detail.

Figure 2:
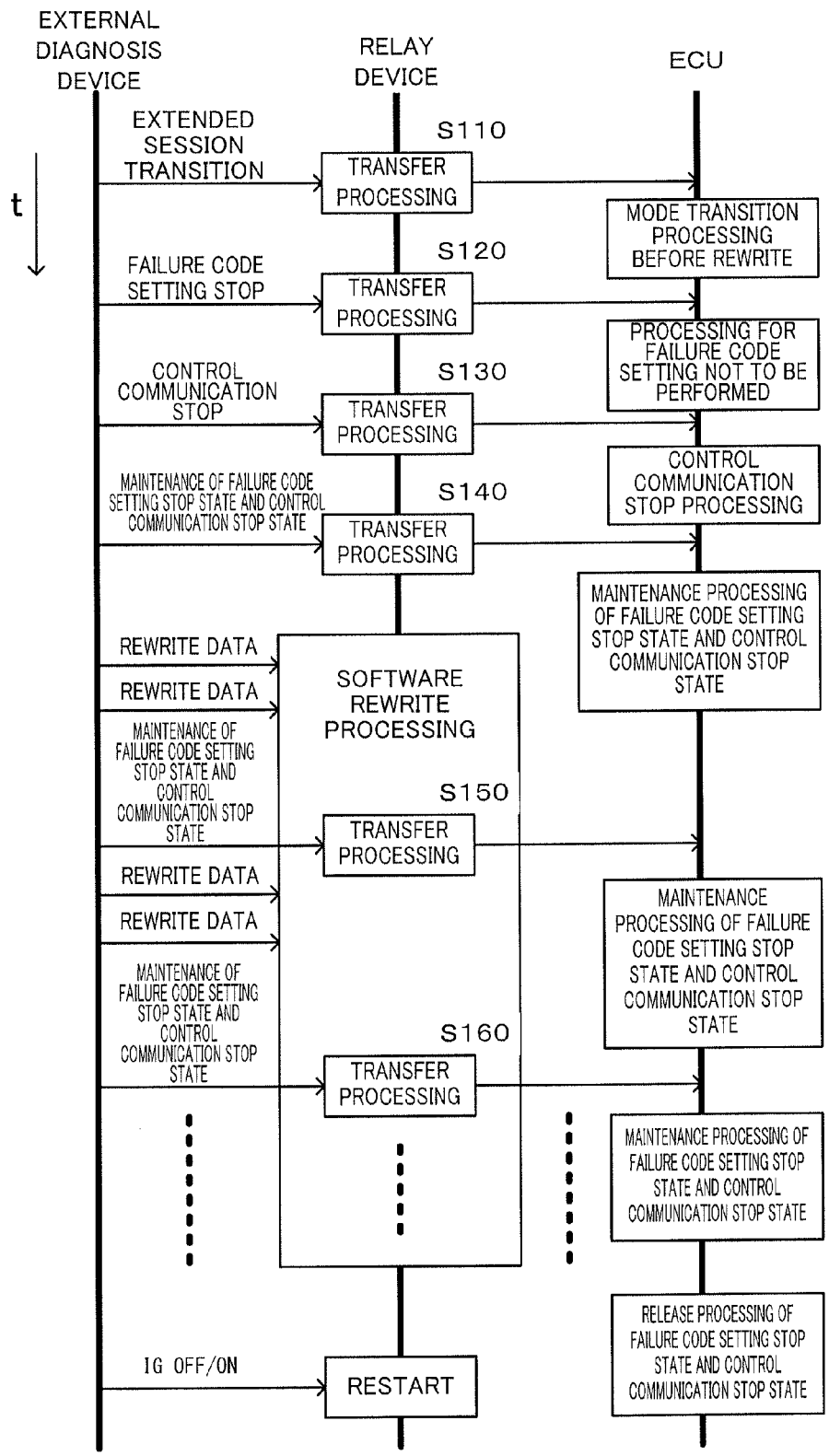
FIG. 2 is a sequence diagram showing an operation procedure of the relay device according to the first embodiment of the present invention.

FIG. 2 is a sequence diagram showing an operation procedure of the relay device according to the first embodiment of the present invention. Time proceeds in a direction of an arrow t.

When the external diagnosis device 10 rewrites the software in the relay device 20, the transfer processing unit 132 transfers data which is transmitted from the external diagnosis device 10 and is necessary for the ECUs to the ECUs 30, 40, 50, and 60.

First, an extended session transition command is transmitted from the external diagnosis device 10 to the relay device 20 (S110). The extended session transition command is a command to perform mode transition before rewriting the software in the relay device. The transfer processing unit 132 transmits the extended session transition command to the ECUs 30, 40, 50, and 60. The ECUs 30, 40, 50, and 60 transit to a mode before rewriting the software.

Next, a failure code setting stop command is transmitted from the external diagnosis device 10 to the relay device 20 (S120). The failure code setting stop command is a command for a failure code not to be stored even when the ECU 30, 40, 50, or 60 detects a failure. The failure code setting stop command is a command that is valid only for a predetermined period of time.

The transfer processing unit 132 transmits a command to prevent failure code setting from being performed to the ECUs 30, 40, 50, and 60. When the ECUs 30, 40, 50, and 60 receive this command, the ECUs 30, 40, 50, and 60 do not store a failure code even if detecting a failure only for the predetermined period of time.

Next, a control communication stop command is transmitted from the external diagnosis device 10 to the relay device 20 (S130). The control communication stop command is a command to prohibit communication related to control to devices connected to the CAN buses 2 and 3. The control communication stop command is a command that is valid only for the predetermined period of time.

The transfer processing unit 132 transmits the control communication stop command to the ECUs 30, 40, 50, and 60. When the ECUs 30, 40, 50, and 60 receive this command, the ECUs 30, 40, 50, and 60 do not perform any communication related to control to devices connected to the CAN buses 2 and 3 at all only for the predetermined period of time. The communication related to control is, for example, communication of vehicle speed data. Communication data related to control is periodically transmitted to all of the ECUs 30, 40, 50, and 60 if not prohibited.

The transfer processing unit 132 prohibits transfer processing of periodic transmission data related to control from each of the ECUs 30, 40, 50, and 60.

Next, a failure code setting stop state and control communication stop state maintenance command is transmitted from the external diagnosis device 10 to the relay device 20 (S140). The failure code setting stop state and control communication stop state maintenance command is a command to maintain the failure code setting stop state and a command to maintain the control communication stop state. The failure code setting stop state and control communication stop state maintenance command is a command that is valid only for the predetermined period of time.

The transfer processing unit 132 transmits the failure code setting stop state and control communication stop state maintenance command to the ECUs 30, 40, 50, and 60. When the ECUs 30, 40, 50, and 60 receive this command, the ECUs 30, 40, 50, and 60 do not store a failure code even if detecting a failure and do not perform any communication related to control to devices connected to the CAN buses 2 and 3 at all only for the predetermined period of time.

Next, data to rewrite the software in the relay device 20 is transmitted from the external diagnosis device 10 to the relay device 20. The software rewrite processing unit 134 performs processing to rewrite the software in the relay device 20 on the basis of the transmitted data. The data to rewrite the software in the relay device 20 is distributed and transmitted. The software rewrite processing unit 134 performs the processing to rewrite the software in the relay device 20 one after another.

While the software rewrite processing unit 134 performs the processing to rewrite the software in the relay device 20, the failure code setting stop state and control communication stop state maintenance command, which is the same command as that transmitted in step S140, is transmitted from the external diagnosis device 10 to the relay device 20 (S150). The transfer processing unit 132 transfers the failure code setting stop state and control communication stop state maintenance command to the ECUs 30, 40, 50, and 60. When the ECUs 30, 40, 50, and 60 receive this command, the ECUs 30, 40, 50, and 60 continuously do not store a failure code even if detecting a failure and do not perform any communication related to control to devices connected to the CAN buses 2 and 3 at all only for the predetermined period of time.

It is required to rewrite the software in the relay device 20 in a short period of time, so that the relay device 20 wants to focus on the software rewrite processing by reducing other processing as much as possible. By stopping transmission related to control to the ECUs 30, 40, 50, and 60, the relay device 20 can omit processing normally performed by the relay device 20, which is transmission and reception of data related to control to and from the ECUs 30, 40, 50, and 60.

While the software in the relay device 20 is being rewritten, the failure code setting stop state and control communication stop state maintenance command is transmitted from the external diagnosis device 10 to the relay device 20 at a cycle shorter than or equal to the predetermined period of time (S160). Every time the command is transmitted, the transfer processing unit 132 transmits the failure code setting stop state and control communication stop state maintenance command to the ECUs 30, 40, 50, and 60. The transfer processing unit 132 transfers nothing other than the failure code setting stop state and control communication stop state maintenance command to the ECUs 30, 40, 50, and 60. When the predetermined period of time is 5 seconds, the cycle shorter than or equal to the predetermined period of time is set to 2 seconds.

Specifically, the transfer processing unit 132 transfers the failure code setting stop state and control communication stop state maintenance command, so that the transfer processing unit 132 allows transfer processing of prohibition data, which indicates at least either one of transmission prohibition of periodic transmission data and storage prohibition of a failure code into each of the ECUs 30, 40, 50, and 60 by not receiving the periodic transmission data in each of the ECUs 30, 40, 50, and 60, to the CAN buses 2 and 3.

Further, the transfer processing unit 132 prohibits transfer processing of data related to control from the ECUs 30, 40, 50, and 60 from the processing in step S130.

Therefore, it is possible to prevent the problem that an error code is stored if data which is periodically transmitted between the ECUs 30, 40, 50, and 60 and is assumed to be periodically received is not received. In this way, it is possible to rewrite the software in the relay device 20 without causing a communication failure between the ECUs 30, 40, 50, and 60 and without applying an unnecessary load to the relay device 20.

When the rewrite of the software in the relay device 20 is completed, the failure code setting stop state and control communication stop state maintenance command is not transmitted from the external diagnosis device 10 to the relay device 20. Therefore, the transfer processing unit 132 does not transmit the failure code setting stop state and control communication stop state maintenance command to the ECUs 30, 40, 50, and 60.

When the rewrite of the software in the relay device 20 is completed, the ECUs 30, 40, 50, and 60 do not receive the next failure code setting stop state and control communication stop state maintenance command within the predetermined period of time from when receiving the failure code setting stop state and control communication stop state maintenance command, so that the ECUs 30, 40, 50, and 60 release the failure code setting stop state and the control communication stop state after the predetermined period of time elapses.

Thereby, the ECUs 30, 40, 50, and 60 returns to an operational state prior to the step 9110. In other words, after the predetermined period of time elapses from when the ECUs 30, 40, 50, and 60 receive data indicating the failure code setting stop state and control communication stop state maintenance command, the ECUs 30, 40, 50, and 60 return to an operational state prior to receive the data.

When the rewrite of the software in the relay device 20 is completed, the external diagnosis device 10 transmits an IG OFF/ON command to the relay device 20 and restarts the relay device 20. Thereby, the rewrite of the software in the relay device 20 by the external diagnosis device 10 is completed and the relay device 20 shifts to a normal state.

Regardless of whether or not the rewrite of the software in the relay device 20 is completed, if the ECUs 30, 40, 50, and 60 do not receive the next failure code setting stop state and control communication stop state maintenance command within the predetermined period of time from when receiving the failure code setting stop command, the control communication stop command, or the failure code setting stop state and control communication stop state maintenance command, the ECUs 30, 40, 50, and 60 return to the operational state prior to the step S110.

Thereby, for example, if a connector connecting the external diagnosis device 10 and the relay device 20 comes off while the software is being rewritten, it is possible to prevent a retry operation of the rewrite from not being able to be normally performed because a periodic transmission prohibition state is not released.

According to the present invention, while the software is being rewritten by the external diagnosis device 10, the transfer processing unit 132 of the relay device 20 prohibits the transfer processing of the control communication data from each of the ECUs 30, 40, 50, and 60 connected to the CAN buses 2 and 3 and allows transfer, processing of the prohibition data, which is transmitted from the external diagnosis device 10 and which indicates at least either one of the transmission prohibition of periodic transmission data and the storage prohibition of a failure code into each of the ECUs 30, 40, 50, and 60 by not receiving the periodic transmission data in each of the ECUs 30, 40, 50, and 60, to the CAN buses 2 and 3.

If the processing as described above is not performed, a problem as described below also occurs.

In an environment in which the external diagnosis device 10 can directly communicate with the ECUs 30, 40, 50, and 60, a failure code store stop signal and a failure code store stop state maintenance signal can be transmitted to the ECUs 30, 40, 50, and 60, so that the ECUs 30, 40, 50, and 60 do not erroneously detect a failure. However, when the relay device 20 is located between the external diagnosis device 10 and the ECUs 30, 40, 50, and 60, the ECUs 30, 40, 50, and 60 cannot directly receive a signal transmitted by the external diagnosis device 10. While the software in the relay device 20 is being rewritten, the relay device 20 may transmits command data dedicated to rewriting of software to the ECUs 30, 40, 50, and 60. However, in this case, it is necessary to implement command data processing dedicated to rewriting of software of the relay device 20 and perform failure code store stop processing.

In the present embodiment, the command data processing dedicated to rewriting of software is not required.

Further, according to the present embodiment, while the software in the relay device 20 is being rewritten, the transfer processing unit 132 transfers data of the failure code setting stop state and control communication stop state maintenance command transmitted from the external diagnosis device 10 to each of the ECUs 30, 40, 50, and 60, so that it is possible to rewrite the software in the relay device 20 without causing a communication failure between the ECUs 30, 40, 50, and 60 and without applying an unnecessary load to the relay device 20.

Further, according to the present embodiment, the prohibition data, which indicates at least either one of the transmission prohibition of periodic transmission data and the storage prohibition of a failure code into each of the ECUs 30, 40, 50, and 60 by not receiving the periodic transmission data in each of the ECUs 30, 40, 50, and 60, is valid only for the predetermined period of time from when each of the ECUs 30, 40, 50, and 60 receives the prohibition data, and the ECUs 30, 40, 50, and 60 return to an operational state prior to the prohibition data is received after the predetermined period of time, which is a valid period of the prohibition data, elapses from when the ECUs 30, 40, 50, and 60 receive the prohibition data. While the software is being rewritten, the transfer processing unit 132 of the relay device 20 receives the prohibition data from the external diagnosis device 10 at a cycle shorter than or equal to the predetermined period of time and transmits the prohibition data.

Thereby, for example, if a connector connecting the external diagnosis device 10 to the CAN bus 1 comes off while the software is being rewritten, it is possible to prevent a retry operation of the rewrite from not being able to be normally performed because a periodic transmission prohibition state is not released.

Second Embodiment

Next, a relay device according to the second embodiment of the present invention will be described.

Figure 3:
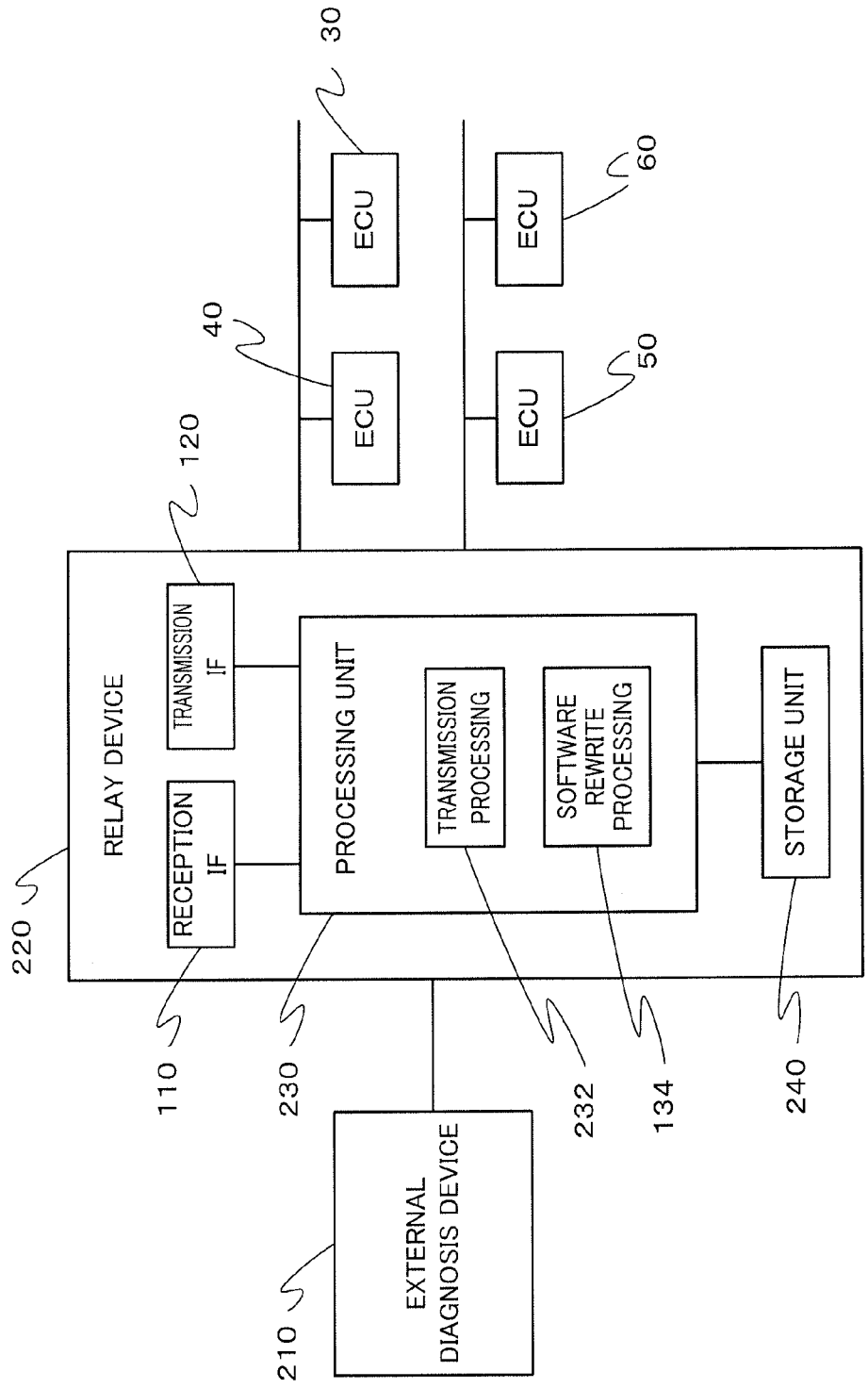
FIG. 3 is a block diagram showing a configuration of an in-vehicle network including a relay device according to a second embodiment of the present invention.

FIG. 3 is a block diagram showing a configuration of an in-vehicle network including the relay device according to the second embodiment of the present invention. The same components as those in the relay device according to the first embodiment shown in FIG. 1 are denoted by the same reference numerals as those in FIG. 1. For the components denoted by the same reference numerals as those in FIG. 1, see the above description of FIG. 1.

In the relay device 220 according to the second embodiment, while the software in the relay device 220 itself is rewritten, commands from the external diagnosis device 210 to the ECUs 30, 40, 50, and 60 are not transmitted to the relay device 220. Instead, the relay device 220 periodically transmits a necessary command to the ECUs 30, 40, 50, and 60.

The connection between the external diagnosis device 210 and the relay device 220 and the connection between the relay device 220 and the ECUs 30, 40, 50, and 60 are the same as those in the first embodiment.

The external diagnosis device 210 is different from the external diagnosis device 10 of the first embodiment in a point that the external diagnosis device 210 does not transmits commands directed to the ECUs 30, 40, 50, and 60 to the relay device 220.

The relay device 220 includes a storage unit 240.

The storage unit 240 may be any non-volatile storage device or a combination of a non-volatile storage device and a volatile storage device, which includes a semiconductor memory and a hard disk device (HDD, Hard Disc Driver). The storage unit 240 stores the extended session transition command, the failure code setting stop command, the control communication stop command, and the failure code setting stop state and control communication stop state maintenance command as a predefined command set.

The relay device 220 includes a transmission processing unit 232 instead of the transfer processing unit 132.

Accordingly, the relay device 220 includes a processing unit 230 instead of the processing unit 130.

Next, an operation of transmission processing performed by the transmission processing unit 232 will be described.

Figure 4:
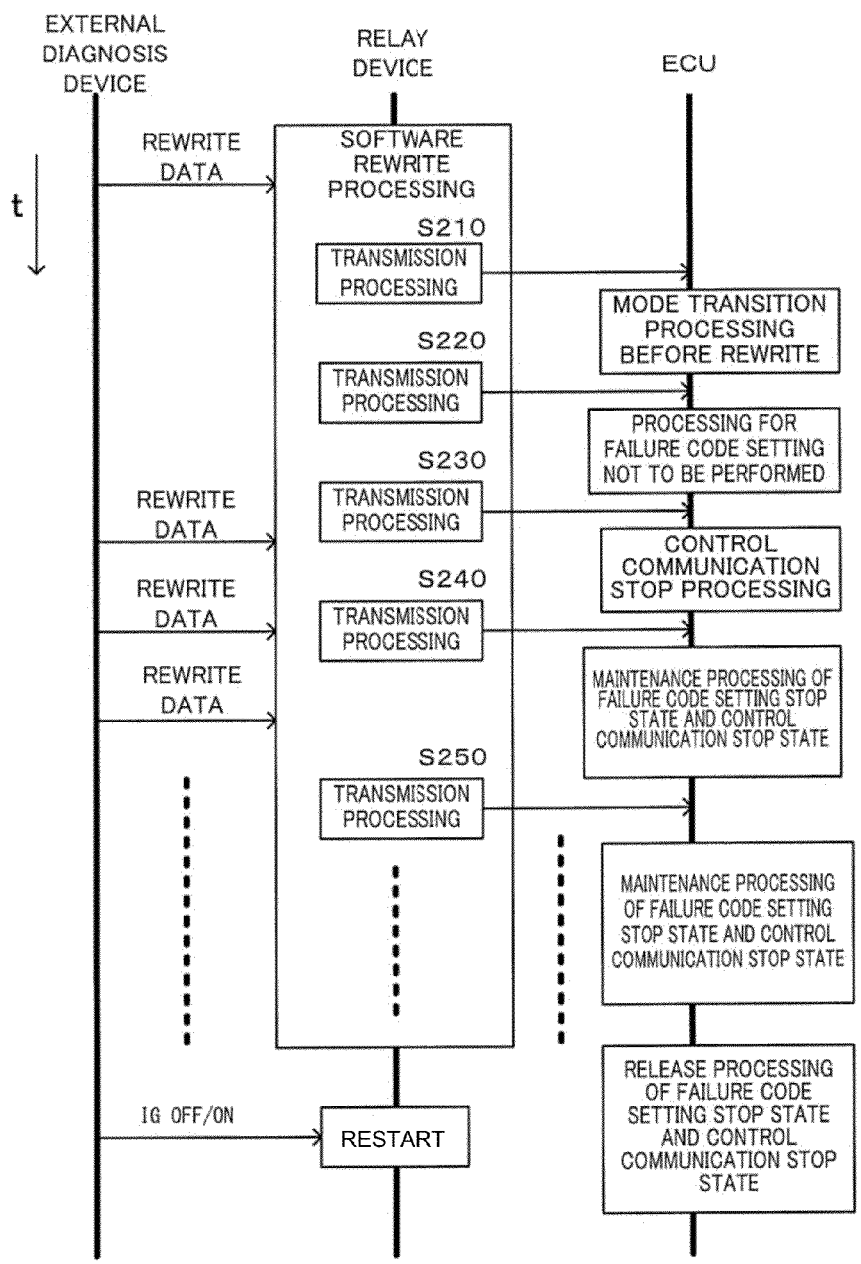
FIG. 4 is a sequence diagram showing an operation procedure of the relay device according to the second embodiment of the present invention.

FIG. 4 is a sequence diagram showing an operation procedure of the relay device 220 according to the second embodiment.

When software rewrite data is transmitted from the external diagnosis device 210, the software rewrite processing unit 134 performs processing to rewrite the software in the relay device 220 itself on the basis of the transmitted data.

When the software rewrite data is transmitted, the transmission processing unit 232 successively transmits the extended session transition command, the failure code setting stop command, and the control communication stop command, which are stored in the storage unit 240, to the ECUs 30, 40, 50, and 60 (S210, S220, and S230).

While the software is being rewritten, the transmission processing unit 232 periodically transmits the failure code setting stop state and control communication stop state maintenance command stored in the storage unit 240 to the ECUs 30, 40, 50, and 60 at a cycle shorter than or equal to the predetermined period of time (S240 and S250).

Thereby, the ECUs 30, 40, 50, and 60 maintains a state in which the ECUs 30, 40, 50, and 60 do not store a failure code even if detecting a failure and do not perform any communication related to control to devices connected to the CAN buses 2 and 3 at all only for the predetermined period of time.

While the software is being rewritten, the processing unit 230 prohibits transfer processing of data related to control from the ECUs 30, 40, 50, and 60. In this way, in the same manner as in the first embodiment, it is possible for the ECUs 30, 40, 50, and 60 to prevent the problem that an error code is stored if data which is periodically transmitted between the ECUs 30, 40, 50, and 60 and is assumed to be periodically received is not received. Further, it is possible to rewrite the software in the relay device 20 without causing a communication failure between the ECUs 30, 40, 50, and 60 and without applying an unnecessary load to the relay device 20.

The process after completing the rewrite of the software in the relay device 220 is the same as that in the first embodiment.

Before the software rewrite data is transmitted, in the same manner as in the first embodiment, control commands directed to the ECUs 30, 40, 50, and 60 may be transmitted from the external diagnosis device 210 and the control commands may be transferred to the ECUs 30, 40, 50, and 60. In this case, the transmission processing unit 232 performs only processing to periodically transmits the failure code setting stop state and control communication stop state maintenance command to the ECUs 30, 40, 50, and 60 while the software is being rewritten.

In the present embodiment, although commands are not transmitted from the external diagnosis device 210 to the ECUs 30, 40, 50, and 60 while the software in the relay device 220 is being rewritten, the relay device 220 autonomously transmits the failure code setting stop state and control communication stop state maintenance command stored in the storage unit 240 to the ECUs 30, 40, 50, and 60 at a cycle shorter than or equal to the predetermined period of time which is a valid period of time of the command.

According to the present embodiment, while the software in the relay device 220 is being rewritten, the transmission processing unit 232 transmits the prohibition data, which indicates at least either one of the transmission prohibition of periodic transmission data and the storage prohibition of a failure code into each of the ECUs 30, 40, 50, and 60 by not receiving the periodic transmission data in each of the ECUs 30, 40, 50, and 60 connected to the CAN buses 2 and 3, to the CAN buses 2 and 3.

Thereby, it is possible to rewrite the software in the relay device 220 without causing a communication failure between the ECUs 30, 40, 50, and 60 and without applying an unnecessary load to the relay device 220 by transmitting the prohibition data that prohibits the communication between the ECUs 30, 40, 50, and 60 and prohibits storing of a failure code to the CAN buses 2 and 3 while the software in the relay device 220 is being rewritten.

Even when the failure code setting stop command, the control communication stop command, and the like cannot be received from the external diagnosis device 210, the relay device 220 can detect that the software in the relay device 220 itself is being rewritten and autonomously transmit signals of these commands, so that communication toughness is improved.

Further, according to the present embodiment, the prohibition data, which indicates at least either one of the transmission prohibition of periodic transmission data and the storage prohibition of a failure code into each of the ECUs 30, 40, 50, and 60 by not receiving the periodic transmission data in each of the ECUs 30, 40, 50, and 60, is valid only for the predetermined period of time from when each of the ECUs 30, 40, 50, and 60 receives the prohibition data, and the ECUs 30, 40, 50, and 60 return to an operational state prior to the prohibition data is received after the predetermined period of time, which is a valid period of the prohibition data, elapses from when the ECUs 30, 40, 50, and 60 receive the prohibition data. While the software is being rewritten, the transmission processing unit 232 of the relay device 220 transmits the prohibition data at a cycle shorter than or equal to the predetermined period of time.

Thereby, for example, if a connector connecting the external diagnosis device 210 to the CAN bus 1 comes off while the software is being rewritten, it is possible to prevent a retry operation of the rewrite from not being able to be normally performed because a periodic transmission prohibition state is not released.

According to the present embodiment, it is not necessary for the relay device 220 to newly define and transmit a signal indicating the rewriting of the software in the relay device 220 itself. Thereby, it is not necessary to add processing related to the failure code store stop while the software in the relay device 220 is being rewritten and the maintenance of the state to the ECUs 30, 40, 50, and 60, which cannot directly receive signals from the external diagnosis device 210.

Embodiments of the present invention are not limited to the embodiments described above, but maybe variously modified within a scope not deviating from the gist of the present technique.

What is claimed is:

1. A relay device including a processing unit and being located between network buses to which a plurality of electronic control devices are communicably connected, wherein
while software in the relay device is being rewritten by an external device, the processing unit is configured to:
prohibit transfer processing of data from each electronic control device connected to the network bus; and
allow transfer processing of a maintenance command from the external device to the network buses, the maintenance command indicating at least either one of maintaining the prohibit transfer processing in each electronic control device and maintaining storage prohibition of a failure code in each electronic control device,
wherein
the maintenance command is valid only for a predetermined period of time from when each electronic control device receives the maintenance command,
each electronic control device is configured to return to an operational state prior to receiving another instance of the maintenance command after the predetermined period of time, which is a valid period of the maintenance command, elapses from when the maintenance command is received, and
the processing unit is configured to receive the maintenance command from the external device at a cycle shorter than or equal to the predetermined period of time while the software is being rewritten.

2. A relay device including a processing unit and being located between network buses to which a plurality of electronic control devices are communicably connected, wherein
while software in the relay device is being rewritten, the processing unit is configured to:
prohibit transfer processing of data from each electronic control device connected to the network bus; and
transmit a maintenance command to the network buses, the maintenance command indicating at least either one of maintaining the prohibit transfer processing in each electronic control device and maintaining storage prohibition of a failure code in each electronic control device,
wherein
the maintenance command is valid only for a predetermined period of time from when each electronic control device receives the maintenance command,
each electronic control device is configured to return to an operational state prior to receiving another instance of the maintenance command after the predetermined period of time, which is a valid period of the maintenance command, elapses from when the maintenance command is received, and
the processing unit is configured to transmit the maintenance command to the network buses at a cycle shorter than or equal to the predetermined period of time while the software is being rewritten.

* * * * *